US008855078B2

(12) United States Patent
Guo

(10) Patent No.: US 8,855,078 B2
(45) Date of Patent: *Oct. 7, 2014

(54) SYSTEM AND METHOD FOR MANAGING RESOURCES IN HETEROGENEOUS NETWORK

(71) Applicant: Sony Corporation, Tokyo (JP)

(72) Inventor: Xin Guo, Beijing (CN)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/056,661

(22) Filed: Oct. 17, 2013

(65) Prior Publication Data

US 2014/0105140 A1    Apr. 17, 2014

Related U.S. Application Data

(62) Division of application No. 13/642,638, filed as application No. PCT/CN2011/073375 on Apr. 27, 2011.

(30) Foreign Application Priority Data

Apr. 30, 2010  (CN) .......................... 2010 1 0162518

(51) Int. Cl.
| | |
|---|---|
| *H04W 4/00* | (2009.01) |
| *H04J 3/17* | (2006.01) |
| *H04L 5/00* | (2006.01) |
| *H04W 16/14* | (2009.01) |

(52) U.S. Cl.
CPC .............. *H04L 5/0073* (2013.01); *H04W 16/14* (2013.01)
USPC .......................... 370/329; 370/341; 370/437

(58) Field of Classification Search
CPC ......... H04J 3/16; H04J 3/1682; H04J 3/1694; H04J 9/00; H04W 24/00; H04W 72/04; H04W 88/08; H04W 76/00; H04W 84/08; H04W 76/02; H04W 84/12; H04W 80/04; H04W 80/18; H04W 88/06; H04B 17/003; H04L 29/06163; H04L 1/0001; H04L 43/50; H04L 43/0852; H04L 43/08
USPC .......................... 370/252, 464, 465, 310–350
See application file for complete search history.

(56) References Cited

U.S. PATENT DOCUMENTS

| | | | |
|---|---|---|---|
| 7,983,216 B2* | 7/2011 | Iyer et al. .................... 370/329 |
| 8,554,147 B2* | 10/2013 | Bhattad et al. ............... 455/63.1 |

(Continued)

FOREIGN PATENT DOCUMENTS

| | | |
|---|---|---|
| CN | 101064952 | 10/2007 |
| CN | 101321385 | 12/2008 |
| CN | 101547512 | 9/2009 |

OTHER PUBLICATIONS

International Search Report issued Aug. 11, 2011, in PCT/CN11/73375 Filed Apr. 27, 2011.

*Primary Examiner* — Warner Wong
(74) *Attorney, Agent, or Firm* — Oblon, Spivak, McClelland, Maier & Neustadt, L.L.P.

(57) ABSTRACT

A system and method for managing resources in a heterogeneous network, which includes a primary system and a secondary system, and in which a communication coverage range of the primary system is divided into a plurality of regions, the system including: a heterogeneous network resource management module configured to collect and manage resource usage status within a managed region; and a secondary system resource management module configured to acquire the resource usage status of each region from the heterogeneous network resource management module and to allocate resources to the secondary system by utilizing the acquired resource usage status of each region in accordance with a priority determined based on an efficiency of resource multiplexing between the primary system and the secondary system in each region. The system and method improve resource usage efficiency.

18 Claims, 11 Drawing Sheets

(56) References Cited

U.S. PATENT DOCUMENTS

| | | | |
|---|---|---|---|
| 2005/0260997 A1* | 11/2005 | Korale et al. | 455/452.2 |
| 2006/0286986 A1* | 12/2006 | Kim et al. | 455/450 |
| 2007/0076649 A1 | 4/2007 | Lin et al. | |
| 2008/0089279 A1* | 4/2008 | Hu et al. | 370/329 |
| 2008/0253341 A1* | 10/2008 | Cordeiro et al. | 370/338 |
| 2008/0268892 A1* | 10/2008 | Hamdi et al. | 455/522 |
| 2009/0197627 A1* | 8/2009 | Kuffner et al. | 455/522 |
| 2010/0087216 A1* | 4/2010 | Ko et al. | 455/500 |
| 2011/0183632 A1* | 7/2011 | Suumaki et al. | 455/77 |
| 2011/0250857 A1* | 10/2011 | Reial et al. | 455/114.2 |
| 2012/0225662 A1* | 9/2012 | Jo et al. | 455/447 |
| 2013/0229934 A1* | 9/2013 | Brisebois et al. | 370/252 |

* cited by examiner

SYSTEM AND METHOD FOR MANAGING RESOURCES IN HETEROGENEOUS NETWORK

CROSS-REFERENCE TO RELATED APPLICATIONS

This is a divisional application of and claims the benefit of priority under 35 U.S.C. §120 from U.S. application Ser. No. 13/642,638, filed Oct. 22, 2012, the entire contents of which is incorporated herein by reference, and which is a national stage of International Application No. PCT/CN11/73375, filed Apr. 27, 2011, which is based upon and claims the benefit of priority under 35 U.S.C. §119 from prior filed Chinese Patent Application No. 201010162518.7, filed Apr. 30, 2010.

FIELD OF THE INVENTION

The present invention relates to the field of communication technology, and more particularly, to a system and method for managing resources in a heterogeneous network such as a heterogeneous radio access network.

BACKGROUND OF THE INVENTION

The global information network is evolving rapidly towards an IP-based NGN (Next Generation Network) with the rapid development of computer and communication technology. Another important feature of the Next Generation Network is that many kinds of radio technologies co-exist to form the heterogeneous radio access network. The heterogeneous radio access network has abundant meanings in terms of radio technology, coverage range, network architecture, network performance and the like, forming stereoscopic coverage in geographic distribution, thus to function together to provide a user with radio multi-media services with abundant contents wherever. In contrast, radio spectral resources used by these access networks are rare.

In order to obtain effective utilization for the resources, limited radio resources need to be multiplexed to the largest extent. It is possible to achieve multiplexing of resources through covering the same region by multiple access networks to form the heterogeneous network; meanwhile, usage status for the spectral resources by each access network varies quickly with time and space, so that it is difficult to control mutual interference among different access networks, thus obstructing efficiency of resource multiplexing.

SUMMARY OF THE INVENTION

The brief summary of the invention will be given below to provide basic understanding of some aspects of the invention. However, it shall be appreciated that this summary is neither exhaustively descriptive of the invention nor intended to define essential or important components or the scope of the invention but is merely for the purpose of presenting some concepts of the invention in a simplified form and hereby acts as a preamble of more detailed descriptions which will be presented later.

In view of the above circumstances of the existing technology, an object of the invention is to provide a system and method for managing resources in a heterogeneous network such as a heterogeneous radio access network capable of effectively improving usage efficiency for resources such as radio spectral resources and the like.

To achieve the above object, according to an aspect of the invention, there is provided a system for managing resources in a heterogeneous network, which includes a primary system and a secondary system, and in which a communication coverage range of the primary system is divided into a plurality of regions, the system including: a heterogeneous network resource management module configured to collect and manage resource usage status within a managed region; and a secondary system resource management module configured to acquire the resource usage status of each region from the heterogeneous network resource management module, and to allocate resources to the secondary system by utilizing the acquired resource usage status of each region in accordance with a priority determined based on an efficiency of resource multiplexing between the primary system and the secondary system in each region.

According to another aspect of the invention, there is further provided a method for managing resources in a heterogeneous network, which includes a primary system and a secondary system and in which a communication coverage range of the primary system is divided into a plurality of regions, the method including the following steps for each secondary system: a resource usage status acquisition step of acquiring resource usage status of each region; and a resource allocation step of allocating resources by utilizing the acquired resource usage status of each region in accordance with a priority determined based on an efficiency of resource multiplexing between the primary system and the secondary system in each region.

According to another aspect of the invention, there is further provided a computer program product for achieving the above method for managing resources in a heterogeneous network.

According to another aspect of the invention, there is provided a computer-readable medium on which computer program codes for achieving the above method for managing resources in a heterogeneous network are recorded.

According to the above technical solutions of the invention, it is possible to greatly improve resource usage efficiency by acquiring the resource usage status of each region and allocating resources to the secondary system in accordance with the priority determined based on the efficiency of resource multiplexing between the primary system and the secondary system in each region.

BRIEF DESCRIPTION OF THE DRAWINGS

The invention can be better understood by referring to the detailed description given below with reference to the accompanying drawings throughout which identical or similar components are denoted by identical or similar reference numbers. The drawings together with the following detailed explanation are included in this specification and form part of the specification so as to further illustrate preferred embodiments of the invention by way of example and explain principles and advantages of the invention. In the drawing.

Figure 1:
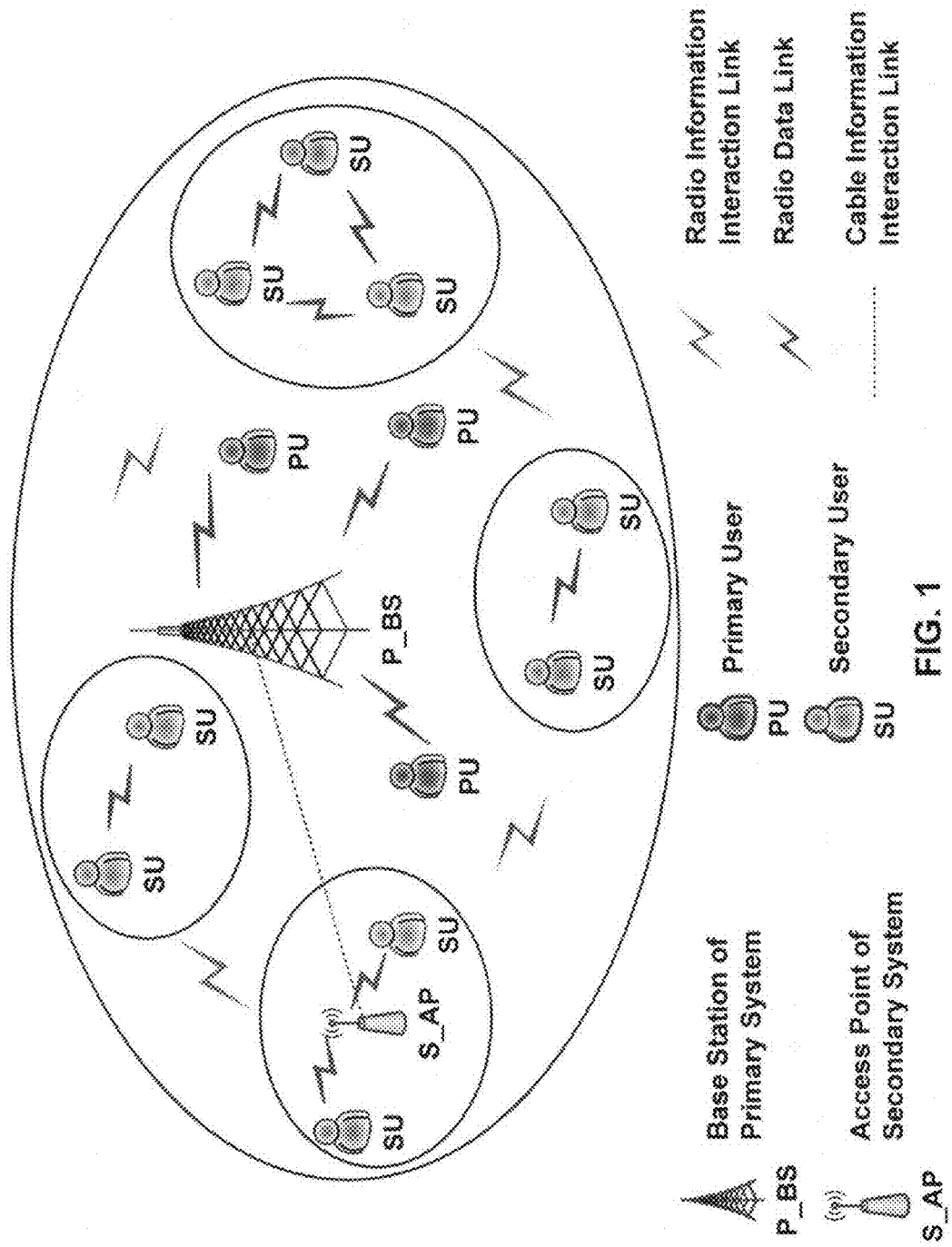
FIG. 1 shows a schematic diagram of a heterogeneous radio access network.

Those skilled in the art should understand that elements in the drawings are merely shown for the purpose of simplicity and clarity but not necessarily drawn to scales. For example, some elements in the drawings may be enlarged relative to other elements so as to improve understanding for the embodiment of the invention.

DETAILED DESCRIPTION OF THE INVENTION

Exemplary embodiments of the present invention will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or processing steps closely relevant to the solutions of the invention are illustrated in the drawings while other details less relevant to the invention are omitted so as not to obscure the invention due to those unnecessary details.

The invention will be described with the heterogeneous radio access network as an example below. However, it is clear to those skilled in the art that the technical solution of the invention may be applicable to any resource management problems and fields in a multi-priority system having similar restrictions as well.

Before the description of the technical solution of the invention, relevant knowledge about the heterogeneous radio access network will be introduced first.

The heterogeneous radio access network includes many kinds of networks, which can be divided into a Wide Area Network (WAN), a Metropolitan Area Network (MAN), a Local Area Network (LAN) and a Personal Area Network (PAN) from the view of coverage range; and divided into a Single-hop Network of Point-to-Multipoint, a Multi-hop Network, a Mesh Network, an Ad Hoc and the like from the view of network architecture. The heterogeneous network covering the same region can be divided into two types from the view of priority of occupying the spectral resources (as shown in FIG. 1), one is a primary system possessing absolute priority of use authority for its operating frequency band and its user is referred to a Primary User (PU); the other is a secondary system, a signal range of which covers part or all of the primary system so that the primary system may be disturbed if the secondary system uses the same radio resource simultaneously with the primary system, and the user of the secondary system is referred to a Secondary User (SU). A rule for sharing resources in the heterogeneous network is that the secondary system can use free resources in the frequency band of the primary system for data transfer only on a premise of not affecting the primary system.

Those skilled in the art shall understand that there is no limitation on the coverage range, the adopted radio technology, the network architecture and the resource usage manners of the heterogeneous radio access network in the invention. The heterogeneous radio access network to which the invention is directed realizes information interaction by interconnecting in a wired or wireless manner.

The system for managing resources in the heterogeneous network such as the heterogeneous radio access network according to the embodiment of the invention will be described in detail with reference to the accompanying drawings below.

Figure 2:
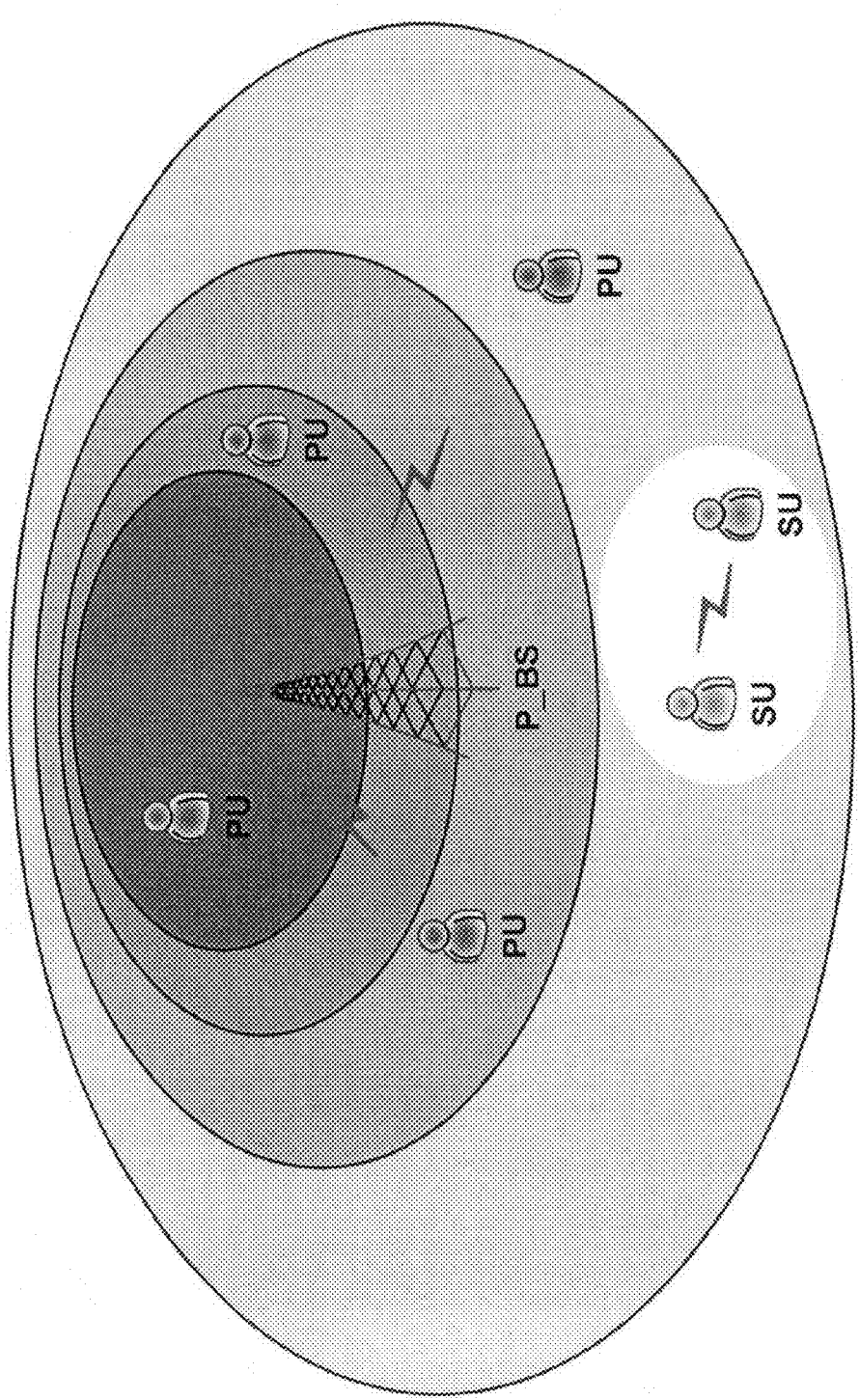
FIG. 2 shows a schematic diagram of efficiency for multiplexing spectral resources between the primary system and the secondary system.

Within the coverage range of the primary system, degrees of mutual interference are different when the primary users at different locations and the secondary system use the same spectral resources simultaneously due to the distance, topographty and physiognomy, and the power control strategy, the smaller the interference being, the higher the efficiency of resource multiplexing being. As shown in FIG. 2, there is given an efficiency diagram when multiplexing resources with the secondary system with a possible spectrum location distribution of the primary system, wherein each gray region and a secondary system white region below multiplex the same resources, the deeper the color of the gray region being, the higher the efficiency of resource multiplexing being.

The invention devises an effective resource management system with consideration of such characteristics of the heterogeneous radio access network, enables the secondary system to quickly acquire a list of available resources with high multiplexing efficiency through cooperation and further decides available power to reduce mutual interference, thus achieving effective utilization of the resources.

Figure 3:
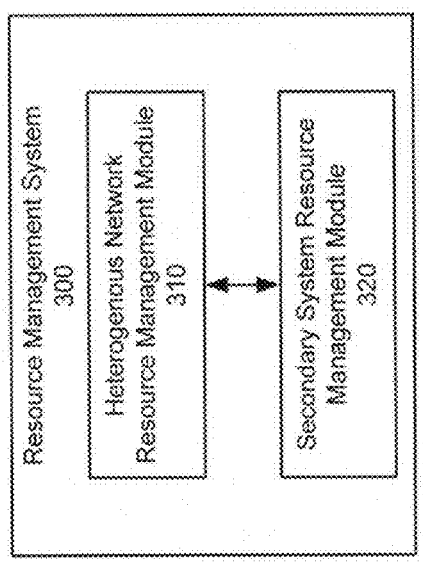
FIG. 3 shows a structural block diagram of a system for managing resources in the heterogeneous network according to an embodiment of the invention.

FIG. 3 shows a structural block diagram of a resource management system 300 according to the embodiment of the invention. As shown in FIG. 3, the resource management system 300 mainly includes a heterogeneous network resource management module 310 and a secondary system resource management module 320.

Figure 4A:
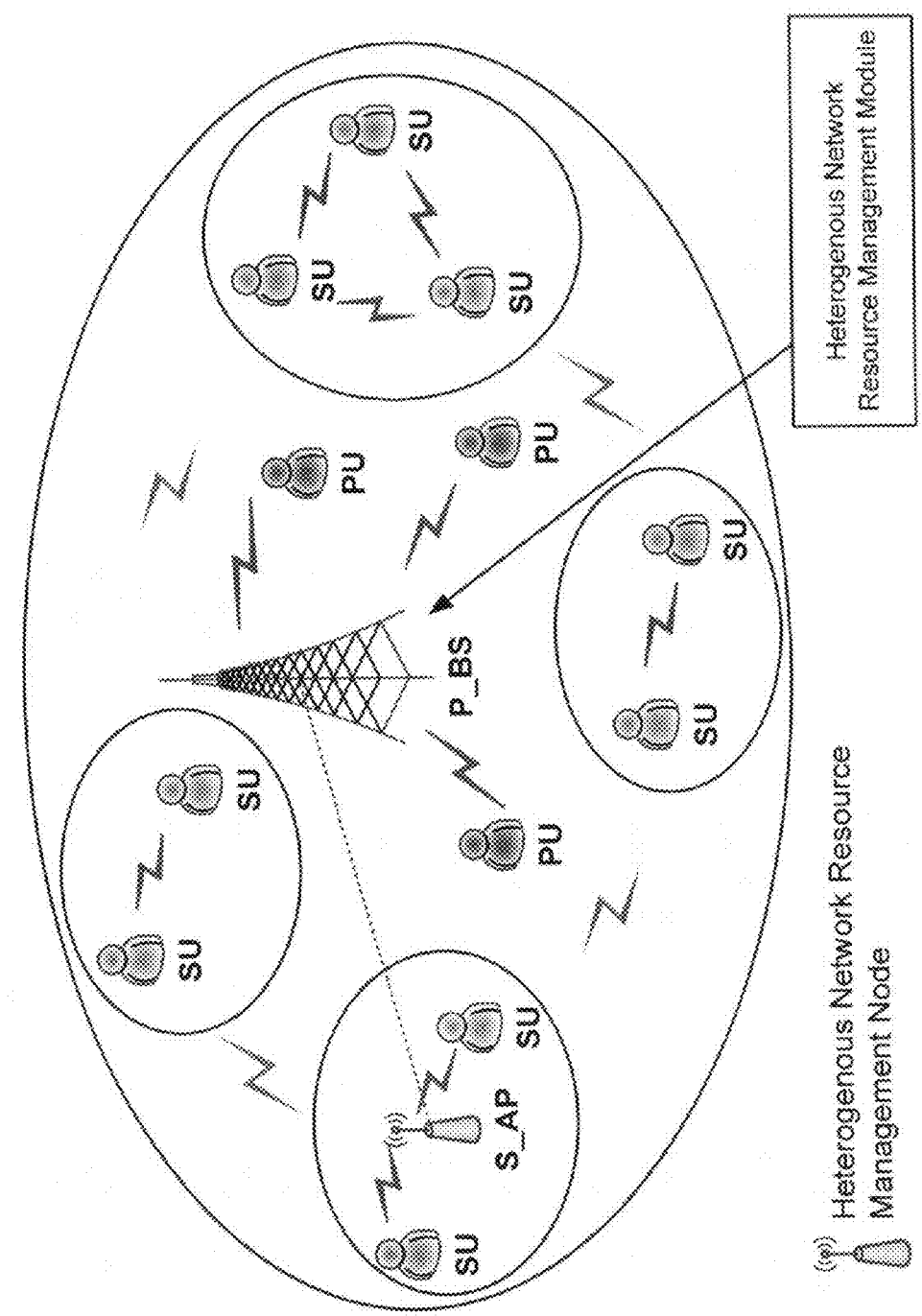
FIG. 4 shows a schematic diagram of arrangement location of a heterogeneous network resource management module according to a specific embodiment of the invention.

The heterogeneous network resource management module 310 may be used to collect and manage resource usage status within the managed region and be responsible for transmitting this information to the secondary system resource management module 320 in the required secondary system. This module has a flexible location in the heterogeneous network (see FIG. 4):

It may be resided within a base station of the primary system (see FIG. 4a). In this situation, the heterogeneous network resource management module 310 is responsible for collecting and managing resource usage status over the whole cell under coverage of a signal of the base station of the primary system.

Figure 4B:
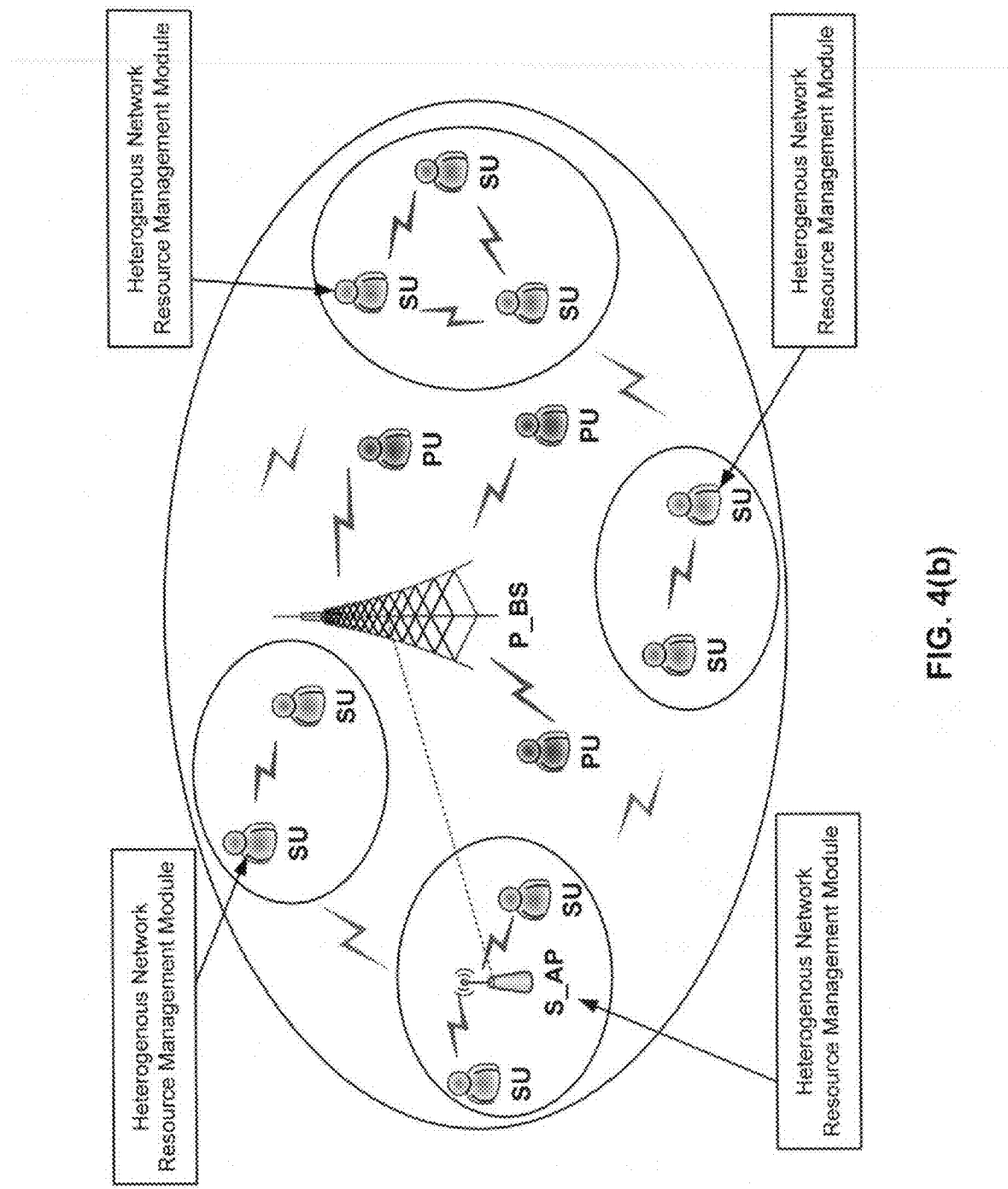

It may be resided within the secondary system, and may be a secondary system access point or a secondary user (see FIG. 4b). In this situation, the heterogeneous network resource management module 310 is responsible for collecting and managing resource usage status of the secondary system and surrounding regions, ranges of the regions being able to be dynamically adjusted as required.

Figure 4C:
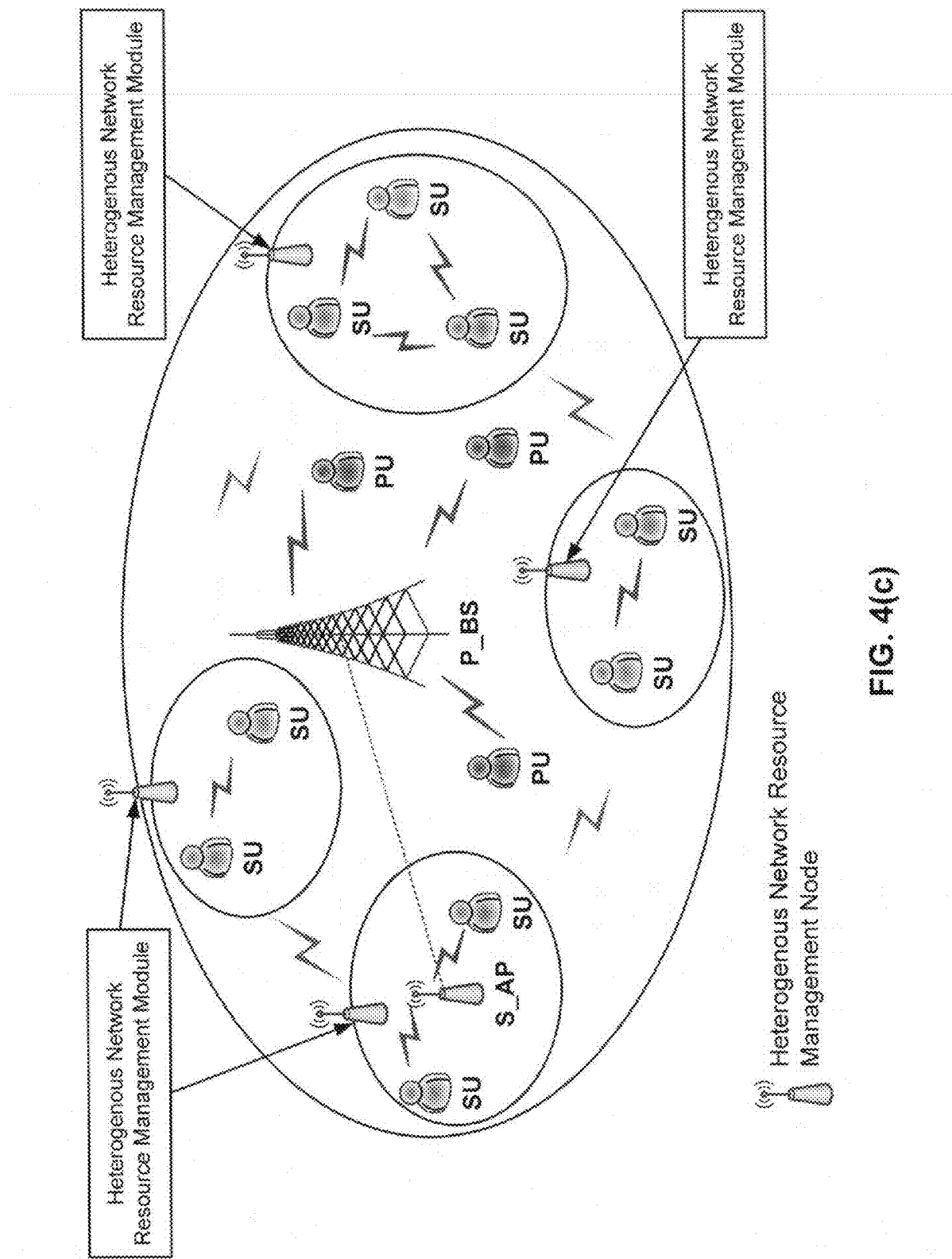

It may be resided within a specialized heterogeneous network resource management node (see FIG. 4c). The node disperses within a coverage range of a signal of the primary system and is responsible for collecting and managing resource usage status of its surrounding regions, ranges of the regions being able to be dynamically adjusted as required.

Figure 5:
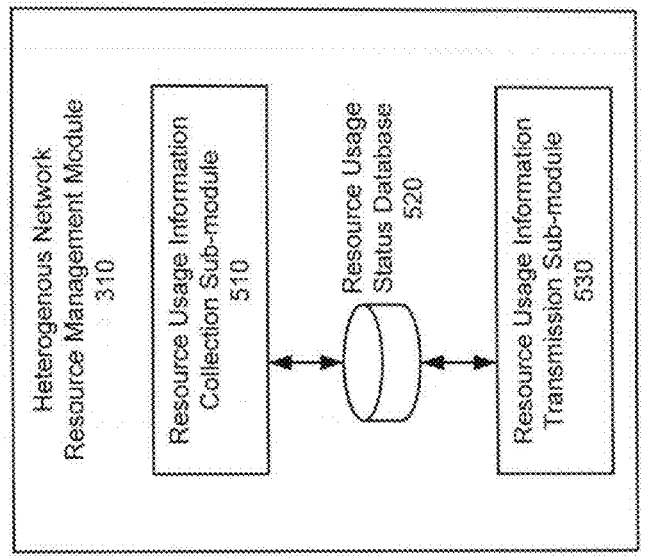
FIG. 5 shows a structural block diagram of the heterogeneous network resource management module according to the specific embodiment of the invention.

FIG. 5 shows a structural block diagram of the heterogeneous network resource management module 310 according to a specific embodiment of the invention. It shall be illustrated herein that the structure of the heterogeneous network resource management module 310 as shown in FIG. 5 is only exemplary, and those skilled in the art may modify the structural block diagram as shown in FIG. 5 as required.

As shown in FIG. 5, the heterogeneous network resource management module 310 may include a resource usage information collection sub-module 510, a resource usage status database 520 and a resource usage information transmission sub-module 530.

Particularly, the resource usage information collection sub-module 510 may be used to collect the resource usage status within the managed region, the resource usage status database 520 may be used to save the resource usage status collected by the resource usage information collection sub-module 510, and the resource usage information transmission sub-module 530 may be used to read the resource usage status saved in the resource usage status database 520 and transmit it to the secondary system resource management module 320. These sub-modules will be further explained below.

The Resource Usage Information Collection Sub-Module 510

The resource usage information collection sub-module 510 is responsible for collecting resource usage status within the managed region and then transmits it to the resource usage status database 520. This collection behavior occurs periodically so that it is ensured that the resource management system information is updated timely. There are two kinds of processing for the managed region:

If the heterogeneous network resource management module 310 resides within the base station of the primary system, the managed region is the whole cell range covered by the base station of the primary system. At this time, the managed region needs to be divided so as to form a plurality of sub managed regions. The sub managed region is generally divided geographically. In particular, the sub managed region may be divided according to the secondary system so that each region contains one or more neighboring secondary systems.

If the heterogeneous network resource management module 310 resides within the secondary system or the heterogeneous network resource management node, the managed region is a surrounding region of this secondary system or the heterogeneous network resource management node.

A manner for resource collection is classified as two kinds:

Interaction with the primary system: the primary system is in charge of the resource usage conditions of respective primary users (including the used frequency spectrums and the received signal power, noise power). The resource usage status collection sub-module 510 may acquire the required resource usage status information through interaction with the base station of the primary system. Such collection manner may be applicable to the following situations: the heterogeneous network resource management module 310 residing within the base station of the primary system; the heterogeneous network resource management module 310 residing within the secondary system and the secondary system and the primary system being able to perform information interaction; and the heterogeneous network resource management module 310 residing within the heterogeneous network resource management node and the heterogeneous network resource management node and the primary system being able to perform information interaction.

Measurement: the secondary system or the heterogeneous network resource management node may acquire the resource usage conditions of its managed region through measurement. At this time, the access point or the secondary user of the secondary system or the heterogeneous network resource management node needs to have a function of spectrum sensing, in which the required resource usage information is obtained through sensing detection. Such collection manner does not require information interaction between the secondary system or the heterogeneous network resource management node and the primary system.

The Resource Usage Status Database 520

The resource usage status database 520 is responsible for storing and maintaining the resource usage status within the managed region. The resource usage status includes:

Spectral resources and status thereof (in operation/free) within the managed region; (in which spectrums in a status of operation represent the spectral resources being used to satisfy service requirements of the primary user; and spectrums in a status of free represent spectral resources allocated to this region with priority when allocating resources or spectrums to be allocated to the user in this region in next period)

Signal power of the spectral resources in the status of operation used by the primary user;

Noise power corresponding to the spectral resources in the status of operation

The Resource Usage Information Transmission Sub-Module 530

The resource usage information transmission sub-module 530 is responsible for deciding a transmission target and a transmission path for the resource usage status information, and then completing a function of reading required information from the resource usage status database 520 and transmitting the same.

If necessary, the resource usage information transmission sub-module 530 may maintain two lists, that is, a secondary system routing information list and a secondary system priority information list.

The secondary system routing information list: holding the routing information from the heterogeneous network resource management module to each secondary system.

The secondary system priority information list: holding priorities for usage of resources stored by the heterogeneous network resource management module by respective secondary systems. An object of defining this priority is to help the secondary system classify the whole heterogeneous network system resources, giving priority to consider the resources with high priority to acquire available resources quickly. Therefore the definition method for priority is that the higher the efficiency of resource multiplexing between the region in which the resource locates and the secondary system is, the higher the priority that the secondary system uses the resource is; on the contrary, the lower the efficiency of resource multiplexing is, the lower the priority that the secondary system uses the resource is. Particularly, the resources with the highest priority further include frequency bands being in the status of free among the spectrums of the primary system. When the heterogeneous network resource management module 310 resides within the base station of the primary system, the efficiency of resource multiplexing may be estimated based on a distance between each region and the secondary system, the larger the distance being, the higher the efficiency of resource multiplexing being; and when the heterogeneous network resource management module 310 resides within the secondary system distributed among each region or within the specialized heterogeneous network resource management node, the efficiency of resource multiplexing may be estimated based on routing information from the heterogeneous network resource management module 310 to each secondary system, the further the route being, the higher the efficiency of resource multiplexing being.

Returning back to FIG. 3, the secondary system resource management module 320 may reside within each secondary system, and may be used to acquire resource usage status of each region from the heterogeneous network resource management module 310 and allocate resources to the secondary system by utilizing the acquired resource usage status of each region in accordance with the priority determined based on the efficiency of resource multiplexing between the primary system and the secondary system in each region, so as to satisfy the business requirements of the secondary system.

Figure 6:
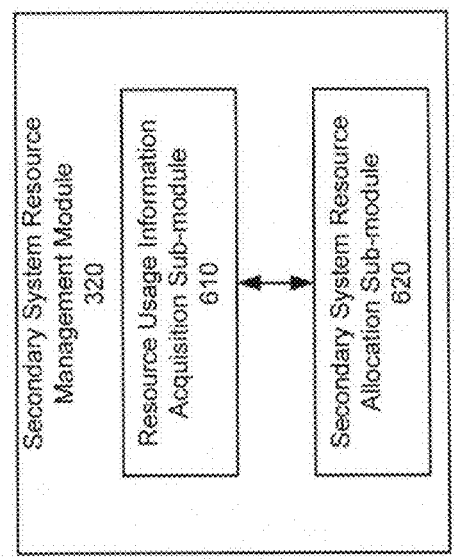
FIG. 6 shows a structural block diagram of a secondary system resource management module according to a specific embodiment of the invention.

FIG. 6 shows a structural block diagram of a secondary system resource management module 320 according to a specific embodiment of the invention. It is to be illustrated herein that the structure of the secondary system resource management module 320 as shown in FIG. 6 is only exemplary, those skilled in the art may modify the structural block diagram as shown in FIG. 6 as required.

As shown in FIG. 6, the secondary system resource management module 320 may include a resource usage information acquisition sub-module 610 and a secondary system resource allocation sub-module 620.

Particularly, the resource usage information acquisition sub-module 610 may be used to acquire the resource usage status of each region from the heterogeneous network resource management module 310 and form the list of available resources, the list of available resources including a sequence of resources available to the secondary system and priorities that the secondary system uses these resources. The secondary system resource allocation sub-module 620 may be used to allocate resources to the secondary system utilizing the list of available resources. These sub-modules will be further explained below.

The Resource Usage Information Acquisition Sub-Module 610

The resource usage information acquisition sub-module 610 is responsible for acquiring the resource usage status of each region from the heterogeneous network resource management module 310. The information is acquired in two ways:

The information acquisition being initiated by the secondary system resource management module 320: the secondary system resource management module 320 transmits an information acquisition request to the heterogeneous network resource management module 310, and the heterogeneous network resource management module 310 acknowledges, transmits the requested information if agrees and transmits a reply of denying transmission if not.

The information transmission being initiated by the heterogeneous network resource management module 310: the heterogeneous network resource management module 310 transmits an information transmission request to the secondary system resource management module 320, and the secondary system resource management module 320 acknowledges, transmits a reply of agreeing reception to the heterogeneous network resource management module 310 if agrees, then the heterogeneous network resource management module 310 transmits corresponding information to the secondary system resource management module 320, and if not, the secondary system resource management module 320 transmits a reply of denying reception to the heterogeneous network resource management module 310.

The information usage information acquisition sub-module 610 forms the list of available resources after receiving the resource usage status information. The list contains a sequence of spectral resources available to the secondary system and priorities that the secondary system uses these spectral resources. Here, the priority information may be obtained by querying a priority information list maintained locally in accordance with regions in which the available spectral resources locate for example, in which the priority information list is similar to the secondary system priority information list described above and storing the priority that the current secondary system uses the resource of each region, and the secondary system priority information list described above is not necessary in this case. Alternatively, the priority information may be for example acquired from the heterogeneous network resource management module 310 together with the resource usage status information.

The Secondary System Resource Allocation Sub-Module 620

The secondary system resource allocation sub-module 620 is responsible for allocating resources to the secondary system by utilizing the list of available resources. The resource allocation mainly includes spectrum selection and/or power control which will be described respectively below:

Spectrum Selection

The secondary system resource allocation sub-module 620 may select available spectrums sequentially from the list of available resources in an order from high to low in terms of the priority. A specific implementation flow will be given with reference to FIG. 7 below.

Figure 7:
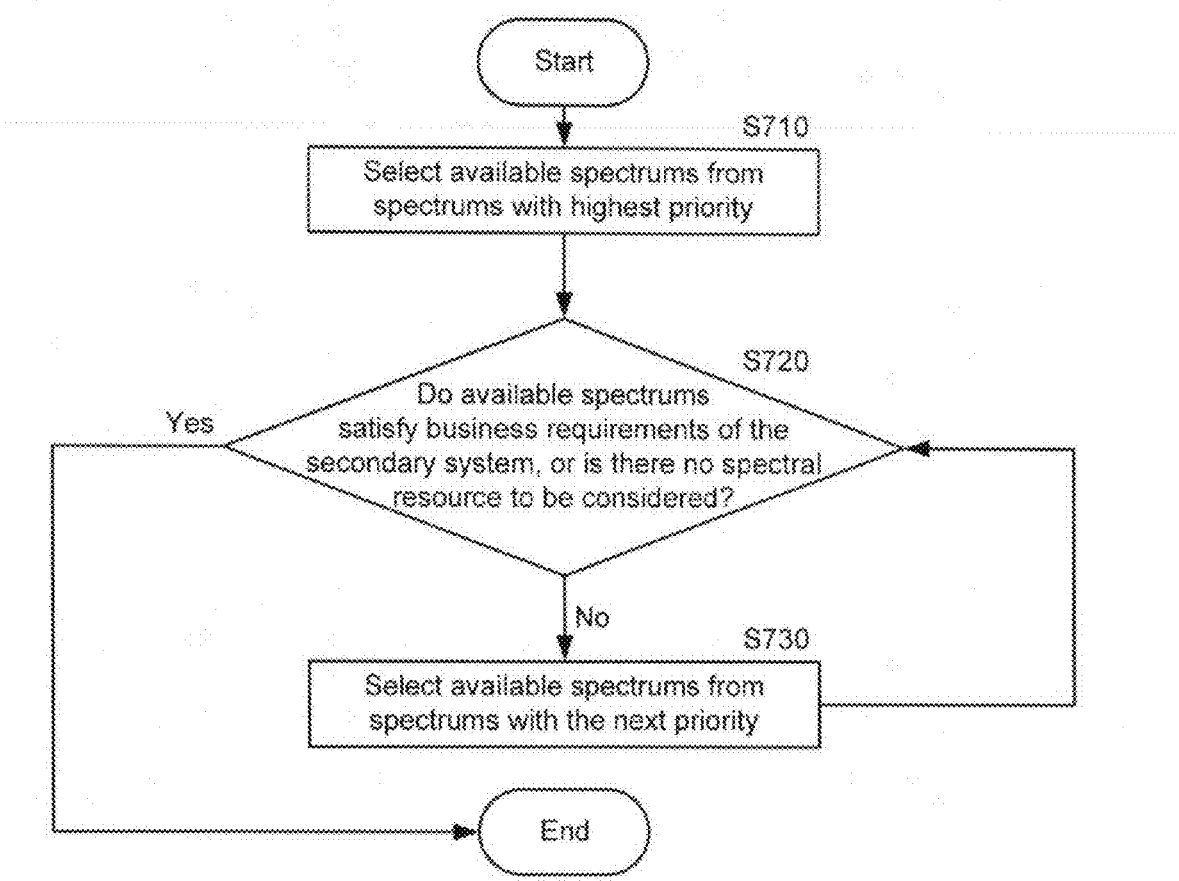
FIG. 7 shows a flow chart of spectrum selection according to a specific embodiment of the invention.

As shown in FIG. 7, first, in step S710, available spectrums are selected from the spectrums with the highest priority. The selection method includes: direct use; obtaining a degree of mutual inference when multiplexing resources with the user of the region in which the spectrum locates through estimation and determining whether to use the spectrum in accordance with the degree of interference; and determining whether the current usage status of the spectrum satisfies a multiplexing condition through spectrum sensing.

Next, in step S720, it is judged whether the selected available spectrums satisfy the business requirement of the secondary system or there is no available spectral resource to be considered.

If the judging result in step S720 is "NO", that is, the selected available spectrums may not yet satisfy the business requirement of the secondary system and there are still spectral resources to be considered, then in step S730, the available spectrums are selected from the spectrums with the next priority. The selection method is identical to that in step S710. Next, the flow returns to step S720 and continues to perform judgment.

On the other hand, if the judging result in step S720 is "YES", that is, the selected available spectrums have been able to satisfy the business requirement of the secondary system or all the spectral resources have already been considered, then the spectrum selection procedure ends.

A Back-Off Power Control Method in Accordance with Priority

The secondary system resource allocation sub-module 620 may perform power control on the selected spectrums using the following back-off power control strategy in accordance with the priority, in which a power level corresponding to the selected spectrum is selected in accordance with the priority, the higher the priority being, the higher the selected power level being; and if it is detected that usage for the spectrum by the secondary system is subject to interference, the power is reduced in accordance with the priority, the lower the priority being, the greater an magnitude in power reduction being. Thus, when more than two secondary systems use the same spectral resource competitively, a priority to use the spectral resource is given to the secondary system which has a higher priority to use the spectral resource. A specific implementation flow will be given with reference to FIG. 8 below.

Figure 8:
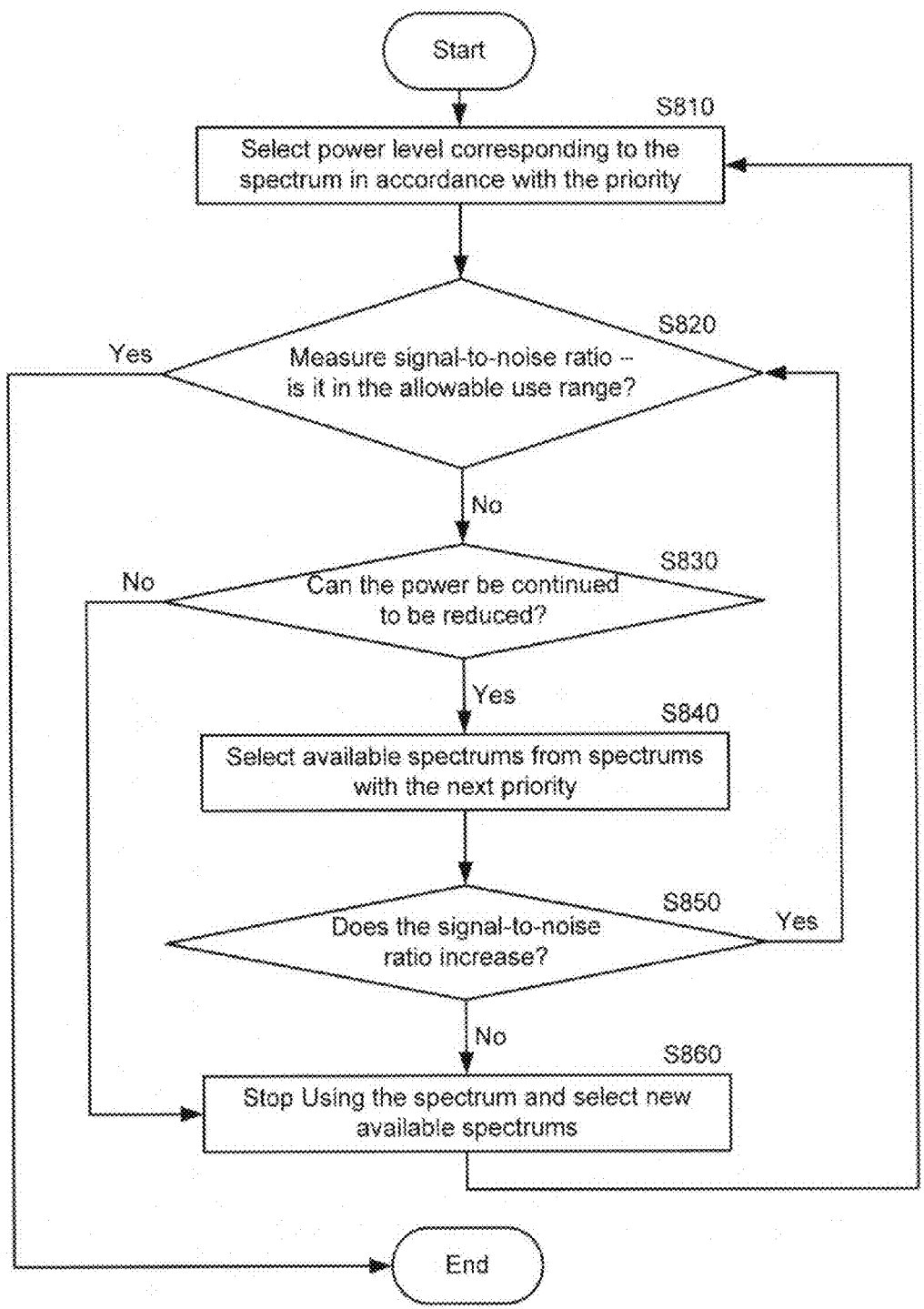
FIG. 8 shows a flow chart of power control according to a specific embodiment of the invention.

As shown in FIG. 8, first, in step S810, the power level corresponding to the selected spectrum is selected in accordance with the priority. The rule is that the higher the priority is, the higher the selectable power level is; and the lower the priority is, the lower the selectable power level is.

Next, in step S820, a signal-to-noise ratio of this spectrum is measured and it is judged whether the signal-to-noise ratio is within an allowable use range. If the signal-to-noise ratio is within the allowable range, that is, higher than a certain threshold, it means that this frequency can be used normally and the power control procedure ends; otherwise, it means that the interference is too great and the processing proceeds to step S830.

In step S830, it is judged whether the power can be continued to be reduced. If not, that is, there is no power level which is even lower, then the processing proceeds to step S860; otherwise, the processing proceeds to step S840.

In step S840, the power is reduced in accordance with the priority. The rule is that the higher the priority is, the smaller the magnitude in power level reduction is and there is even no reduction; and the lower the priority is, the greater the magnitude in power level reduction is.

Next, in step S850, it is judged whether the signal-to-noise ratio increases. If not, that is, there is no increase, then it means that the interference noise mainly comes from the primary user, and the processing proceeds to step S860; otherwise, that is, if the signal-to-noise increases, then it means that the interference noise is caused by the other secondary system, and the processing proceeds to step S820.

In step S860, this spectrum is stopped being used and other available spectrums are selected from the spectrum selection result, then the processing returns to step S810 to restart the power control.

In order to better explain the resource allocation processing performed by the secondary system resource allocation sub-module 620, an exemplary scene to which the present invention is applied will be described in detail with reference to FIG. 9 below.

Figure 9A:
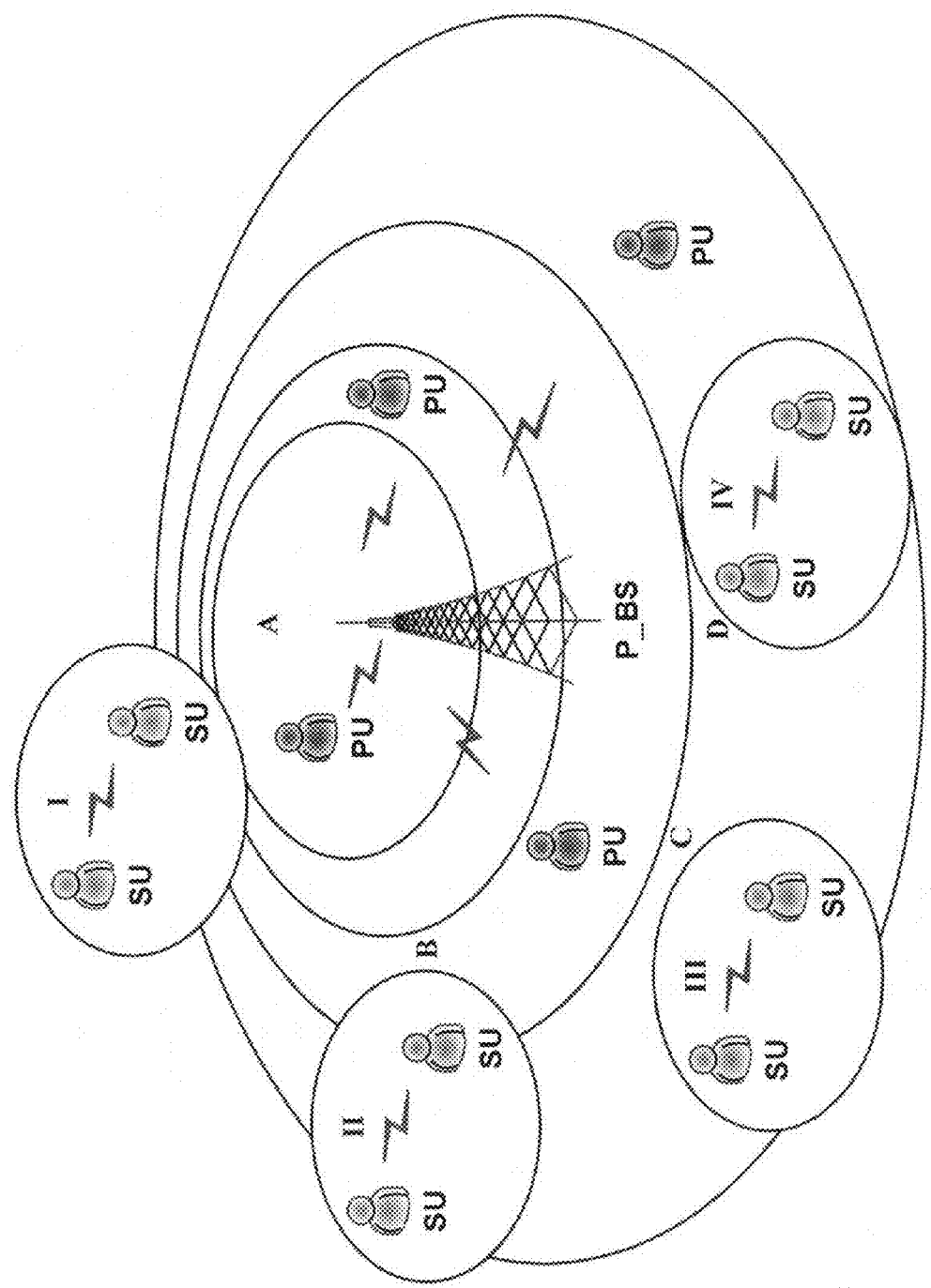
FIG. 9 shows an exemplary scene of allocating resources by the secondary system resource management module according to an embodiment of the invention.

In the exemplary scene in FIG. 9, one or more secondary systems are distributed within the coverage range of the signal of the primary system, and these secondary systems are denoted as I, II, III and IV respectively in FIG. 9a. The primary system serves the primary users within the secondary system I and surrounding regions thereof, and the used spectral resources are written as A; serves the primary users within the secondary system II and surrounding regions thereof, and the used spectral resources are written as B; serves the primary users within the secondary system III and surrounding regions thereof, and the used spectral resources are written as C; and serves the primary users within the secondary system IV and surrounding regions thereof, and the used spectral resources are written as D. Further, in the exemplary scene in FIG. 9, the priority information in the list of available resources of each secondary system is estimated based on the routing information from each heterogeneous network resource management module residing within each secondary system to the secondary system, in which an initial priority of the information is set as 0, and the priority is increased by 1 accordingly with the route being increased by one hop, the greater the value of the priority being, the higher the corresponding priority being. Exemplary lists of available resources of the secondary systems IV, III, II and I are illustrated respectively below, in which the column route is added for convenience of description and can be omitted in practice:

TABLE 1

A list of available resources of the secondary system IV

| Spectral resource | Route | Priority |
|---|---|---|
| A | I->II->III->IV | 3 |
| B | II->III->IV | 2 |
| C | III->IV | 1 |
| D | IV | 0 |

TABLE 2

A list of available resources of the secondary system III

| Spectral resource | Route | Priority |
|---|---|---|
| A | I->II->III | 2 |
| B | II->III | 1 |
| C | III | 0 |
| D | IV-> III | 1 |

TABLE 3

A list of available resources of the secondary system II

| Spectral resource | Route | Priority |
|---|---|---|
| A | I->II | 1 |
| B | II | 0 |
| C | III->II | 1 |
| D | IV-> III->II | 2 |

TABLE 4

A list of available resources of the secondary system I

| Spectral resource | Route | Priority |
|---|---|---|
| A | I | 0 |
| B | II->I | 1 |
| C | III->II->I | 2 |
| D | IV-> III->II->I | 3 |

Thus, the secondary system resource allocation sub-module 620 of the secondary system IV may select available spectrums A, B, C and D sequentially in an order from high to low in terms of the priority. The secondary system resource allocation sub-module 620 of the secondary system III may select available spectrums A, B, D and C sequentially in an order from high to low in terms of the priority. The secondary system resource allocation sub-module 620 of the secondary system II may select available spectrums D, A, C and B sequentially in an order from high to low in terms of the priority. The secondary system resource allocation sub-module 620 of the secondary system I may select available spectrums D, C, B and A sequentially in an order from high to low in terms of the priority.

Figure 9B:
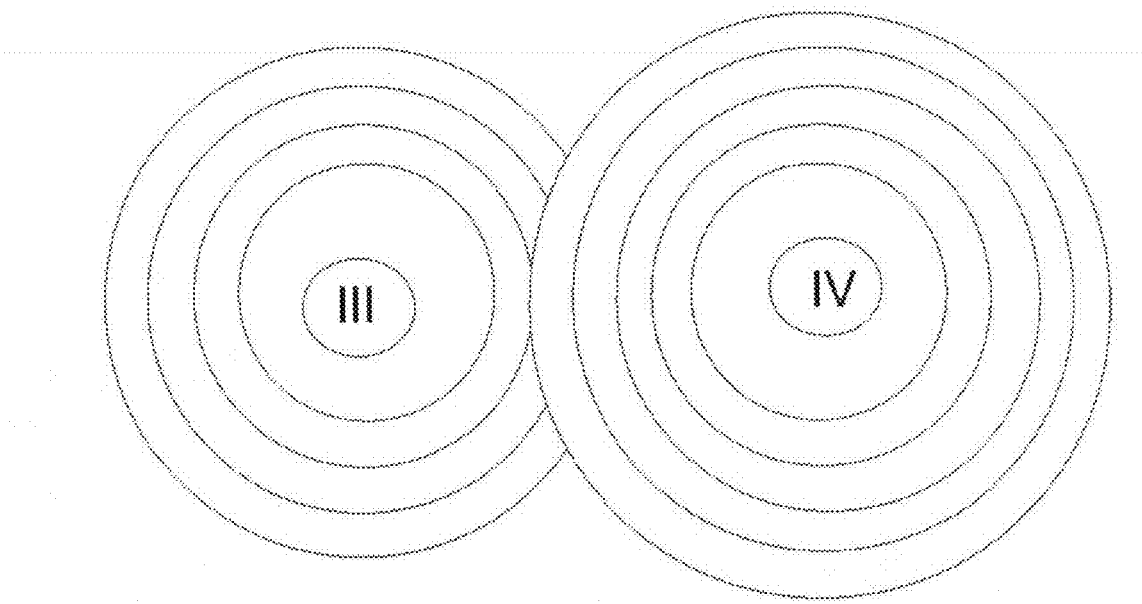
Figure 9C:
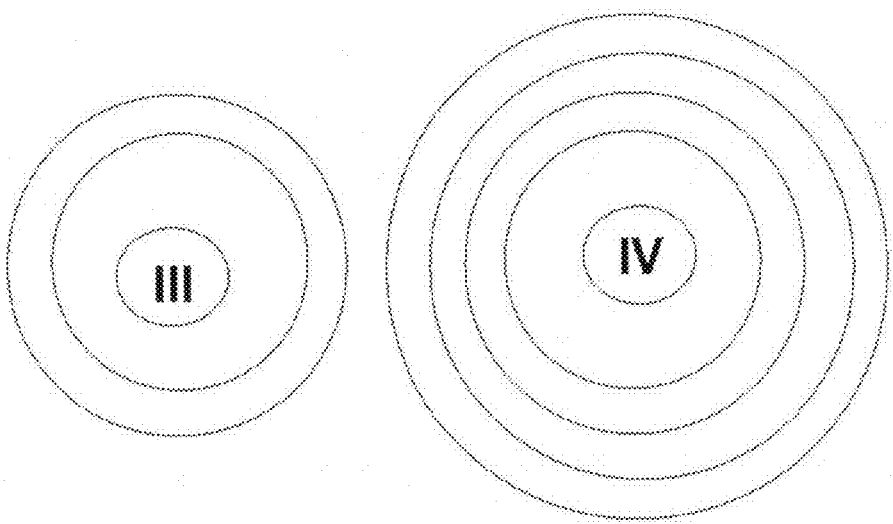

For example, when the secondary system IV and the secondary system III select the spectrum A simultaneously, the secondary system IV selects higher power level than the secondary system III since the secondary system IV has a higher priority to use the spectrum A than the secondary system III, as shown in FIG. 9b. Moreover, when there is mutual interference between the use of spectrum A by the secondary system IV and the secondary system III as shown in FIG. 9b, both the secondary system IV and the secondary system III will reduce the power of the spectrum A, and the magnitude in power reduction of the secondary system III is larger than that of the secondary system IV since the secondary system IV has a higher priority to use the spectrum A than the secondary system III, as shown in FIG. 9c. After the power control described above, it is possible to enable the caused mutual interference between the use of the spectrum A by the secondary system IV and the secondary system III to reach an allowable range, and to ensure that the secondary system IV has a higher priority to use the spectrum A than the secondary system III, as shown in FIG. 9c.

The system for managing resources in the heterogeneous network according to the embodiment of the invention has been described in detail with reference to the drawings above. A method for managing resources in the heterogeneous network according to an embodiment of the invention will be described with reference to the drawings below.

Figure 10:
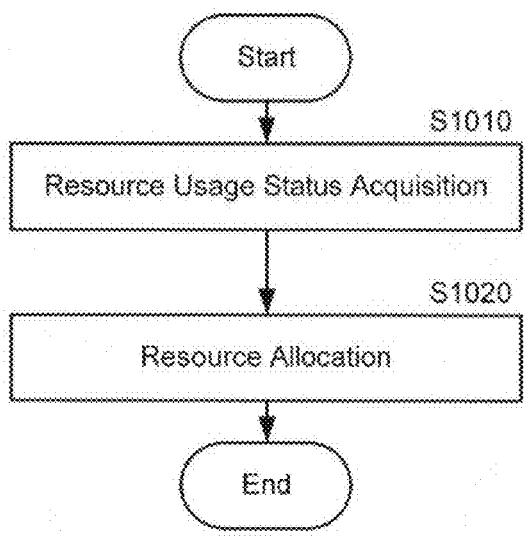
FIG. 10 shows a flow chart of a method for managing resources in the heterogeneous network according to an embodiment of the invention.

FIG. 10 shows a flow chart of the method for managing resources in the heterogeneous network according to the embodiment of the invention. This procedure is performed for each secondary system.

As shown in FIG. 10, first, in step S1010, resource usage status of each region is acquired.

Next, in step S1020, the resource is allocated by utilizing the acquired resource usage status of each region in accordance with a priority determined based on an efficiency of resource multiplexing between the primary system and this secondary system in each region.

Various alternative or preferable implementations of the method have been described in detail above, and no repeated explanation will be made herein.

Basic principles of the invention have been described in combination with specific embodiments above, but it shall be noted that those skilled in the art can understand that all or any of steps or components of the method and device of the invention may be implemented by hardware, firmware, software or combinations thereof in any computing device (including a processor, a storage medium or the like) or a network of computing devices, which can be achieved by those skilled in the art by utilizing their basic programming skills after reading the description of the invention.

Therefore, the object of the invention may also be achieved by running a program or a set of programs on any computing devices. The computing devices may be well-known general-purpose devices. Therefore, the object of the invention may also be achieved simply by providing a program product containing program codes implementing the method or device. That is, such a program product constitutes the invention, and a storage medium storing such a program product also constitutes the invention. Obviously, the storage medium may be any well-known storage medium or any storage medium to be developed in the future.

Figure 11:
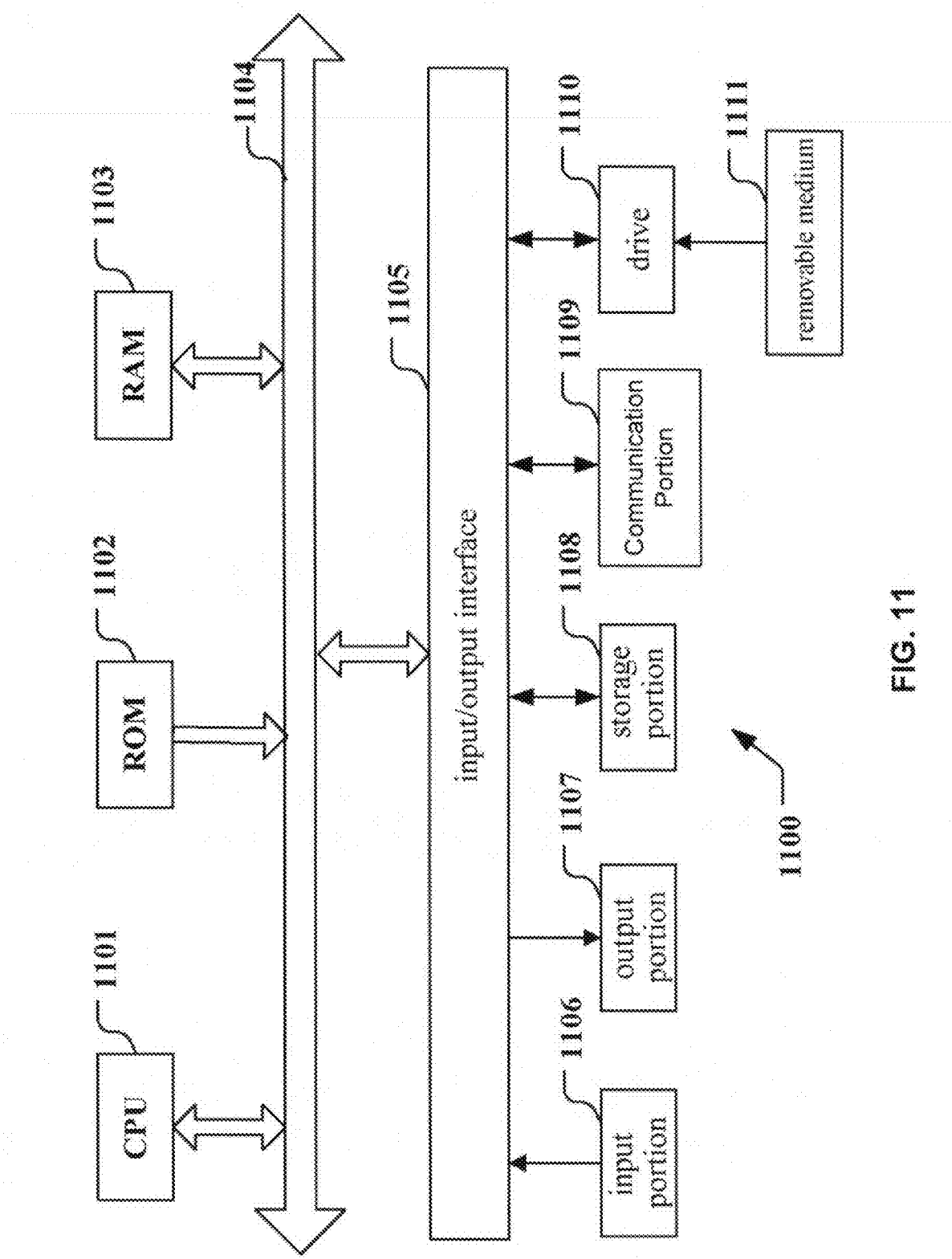
FIG. 11 shows an exemplary structural block diagram of a computer in which the invention is implemented.

In a case that the embodiments of the invention are implemented by software and/or firmware, programs constituting the software are installed from a storage medium or a network into a computer with a dedicated hardware structure, for example, a general-purpose computer 1100 illustrated in FIG. 11, which can carry out various functions and the like when installed with various programs.

In FIG. 11, a central processing unit (CPU) 1101 executes various processes in accordance with a program stored in a read only memory (ROM) 1102 or a program loaded from a storage portion 1108 to a random access memory (RAM) 1103. Data required for the CPU 1101 to execute various processes and the like is also stored in the RAM 1103 as required. The CPU 1101, the ROM 1102 and the RAM 1103 are connected to one another via a bus 1104. An input/output interface 1105 is also connected to the bus 1104.

The following components are connected to the input/output interface 1105: an input portion 1106 including a keyboard, a mouse, and the like; an output portion 1107 including a display such as a cathode ray tube (CRT), a liquid crystal display (LCD), and the like, a speaker and the like; the storage portion 1108 including a hard disk or the like; and a communication portion 1109 including a network interface card such as a LAN card, a modem, and the like. The communication portion 1109 performs communication via the network such as Internet.

A drive 1110 is also connected to the input/output interface 1105 as required. A removable medium 1111, such as a magnetic disk, an optical disk, a magneto optical disk, a semiconductor memory, or the like, is mounted on the drive 1110 as required, so that a computer program read therefrom is installed into the storage portion 1108 as required.

In a case that the above-described series of processes are implemented by the software, the program that constitutes the software is installed from the network such as the Internet or the storage medium such as the removable medium 1111.

Those skilled in the art should understand that this storage medium is not limited to the removable medium 1111 in which a program is stored and which is distributed separately from the device so as to provide the program to the user as shown in FIG. 11. Examples of the removable medium 1111 include the magnetic disk (including floppy disk (registered trade mark)), the optical disk (including compact disk-read only memory (CD-ROM) and digital versatile disk (DVD)), the magneto optical disk (including mini disk (MD) (registered trade mark)) and the semiconductor memory. Alternatively, the storage medium may be the ROM 1102, the hard disk contained in the storage portion 1108 or the like, in which a program is stored and which is distributed to the user together with the device containing it.

It shall also be noted that obviously each component or each step may be decomposed and/or recombined in the device and method of the present invention. These decompositions and/or re-combinations shall be considered as equivalent schemes of the present invention. Also, the steps of performing the above series of processes may be naturally performed chronologically in an order of description but not necessarily. Some steps may be performed in parallel or independently from one another.

Although the invention and advantages thereof have been described in detail herein, it shall be understood that various changes, replacements and modifications may be made by one skilled in the art without departing from the spirit and scope of the invention defined by the appended claims. Furthermore, the terms "comprise", "include" or any other variation thereof are intended to cover a non-exclusive inclusion, so that a process, method, article, or device that comprises a list of elements includes not only those elements but also other elements not explicitly listed or inherent to such process, method, article, or device. Unless further defined, a sentence "comprises a/an . . . " which defines an element does not preclude the existence of additional identical element(s) in the process, method, article, or device that comprises the element.

The invention claimed is:

1. A system for managing resources in a heterogeneous network, which comprises a primary system, a secondary system, and a communication coverage range that is divided into a plurality of regions, the system comprising:
   a heterogeneous network resource management circuit configured to collect and manage resource usage status within a managed region; and
   a secondary system resource management circuit configured to acquire the resource usage status of each of the regions from the heterogeneous network resource management circuit, and to allocate resources to the secondary system by utilizing the acquired resource usage status of each of the regions and in accordance with a priority determined based on an efficiency of resource multiplexing between each of the regions and the secondary system, wherein
   the heterogeneous network resource management circuit resides within a base station of the primary system, the secondary system or a specialized heterogeneous network resource management node,
   when the heterogeneous network resource management circuit resides within the base station of the primary system, the efficiency of resource multiplexing is estimated based on a distance between each of the regions and the secondary system such that the greater the distance, the higher the efficiency of resource multiplexing, and
   when the heterogeneous network resource management circuit resides within the secondary system distributed among respective regions or within the specialized heterogeneous network resource management node, the efficiency of resource multiplexing is estimated based on routing information from the heterogeneous network resource management module to the secondary system such that the further the route, the higher the efficiency of resource multiplexing.

2. The system according to claim 1, wherein each of the regions corresponds to a secondary system at a specific geo-location.

3. The system according to claim 1, wherein the priority is to help the secondary system classify the resources in the heterogeneous network.

4. The system according to claim 3, wherein the resources in the heterogeneous network are classified by a list of available resources containing a sequence of resources available to the secondary system and the priority that the secondary system uses these resources.

5. The system according to claim 4, wherein the secondary system resource management module further comprises:
   a resource usage information acquisition sub-circuit configured to acquire the resource usage status of each of the regions from the heterogeneous network resource management circuit and form the list of available resources; and
   a secondary system resource allocation sub-circuit configured to allocate resources to the secondary system utilizing the list of available resources.

6. The system according to claim 5, wherein the secondary system resource allocation sub-circuit is configured to sequentially select available resources from the list of available resources in an order from high to low in terms of the priority.

7. The system according to claim 1, wherein the secondary system resource allocation circuit is configured to determine operational parameters for the secondary system in accordance with a degree of mutual interference when multiplexing resources with the user of the region in which the resource locates.

8. The system according to claim 7, wherein the operational parameters include spectrum or transmit power.

9. The system according to claim 1, wherein the heterogeneous network resource management circuit further comprises:
   a resource usage information collection sub-circuit configured to collect the resource usage status within the managed region;
   a resource usage status database configured to save the resource usage status collected by the resource usage information collection sub-circuit; and
   a resource usage information transmission sub-circuit configured to read the resource usage status saved in the resource usage status database and transmit the same to a secondary system resource management circuit.

10. A method for managing resources in a heterogeneous network which comprises a primary system, a secondary system and a communication coverage range that is divided into a plurality of regions, the method comprising the following steps for each secondary system:
   a resource usage status acquisition step of acquiring resource usage status of each of the regions; and
   a resource allocation step of allocating resources by utilizing the acquired resource usage status of each of the regions in accordance with a priority determined based on an efficiency of resource multiplexing between each of the regions and the secondary system, wherein
   the resource usage status of each of the regions is collected by one or more heterogeneous network resource management circuits, and in the resource usage status acquisition step, the resource usage status of each of the regions is acquired through communication with the heterogeneous network resource management circuit,
   the heterogeneous network resource management circuit resides within a base station of the primary system, the secondary system or a specialized heterogeneous network resource management node,
   when the heterogeneous network resource management circuit resides within the base station of the primary system, the efficiency of resource multiplexing is estimated based on a distance between each of the regions and the secondary system such that the greater the distance, the higher the efficiency of resource multiplexing, and
   when the heterogeneous network resource management circuit resides within the secondary system distributed among respective regions or within the specialized heterogeneous network resource management node, the efficiency of resource multiplexing is estimated based on routing information from the heterogeneous network resource management circuit to the secondary system such that the further the route, the higher the efficiency of resource multiplexing.

11. The method according to claim 10, wherein each of the regions corresponds to a secondary system at a specific geo-location.

12. The method according to claim 10, wherein the priority is to help the secondary system classify the resources in the heterogeneous network.

13. The method according to claim 12, wherein the resources in the heterogeneous network are classified by a list of available resources containing a sequence of resources available to the secondary system and the priority that the secondary system uses these resources.

14. The method according to claim 13, wherein the resource allocation step further comprises:
   a resource usage information acquisition sub-step of acquiring the resource usage status of each of the regions and forming the list of available resources; and
   a secondary system resource allocation sub-step of allocating resources to the secondary system utilizing the list of available resources.

15. The method according to claim 14, wherein in the secondary system resource allocation sub-step, available resources are selected from the list of available resources sequentially in an order from high to low in terms of the priority.

16. The method according to claim 10, further comprising determining operational parameters for the secondary system in accordance with a degree of mutual interference when multiplexing resources with the user of the region in which the resource locates.

17. The method according to claim 16, wherein the operational parameters include spectrum or transmit power.

18. A non-transitory computer-readable storage medium including computer-readable instructions that, when executed by a processing system, cause the processing system to perform the method according to claim 10.

* * * * *